May 11, 1926. 1,584,362
J. C. FITZGERALD
DRINKING BOWL FOR ANIMALS
Filed Nov. 11, 1925  2 Sheets-Sheet 2
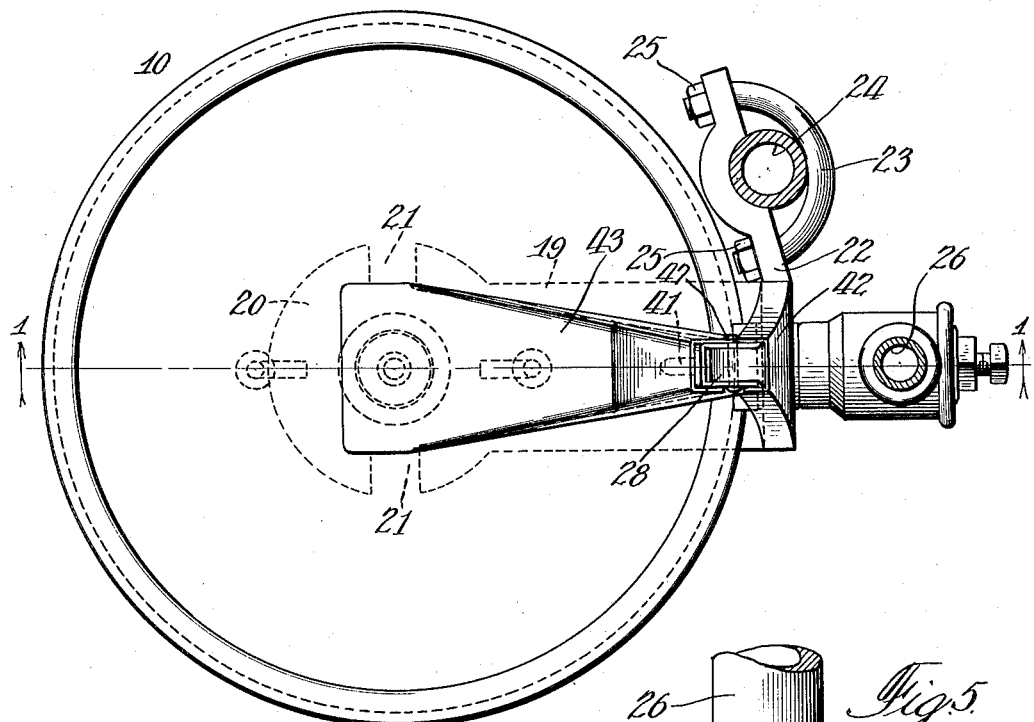
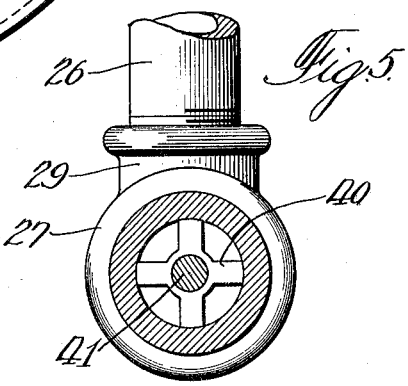
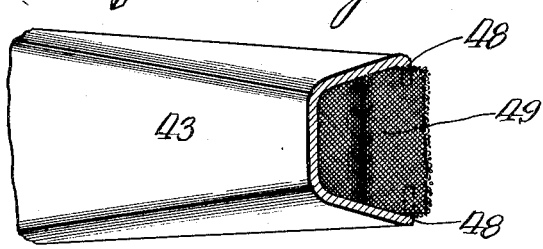

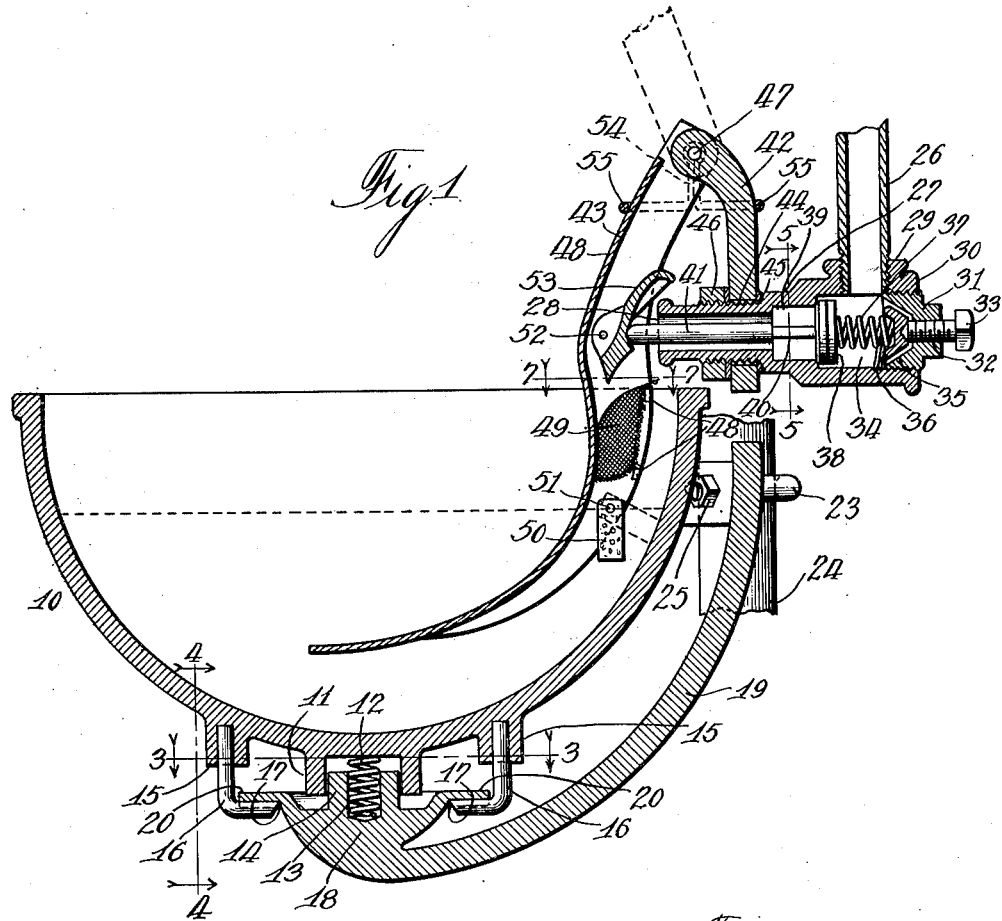
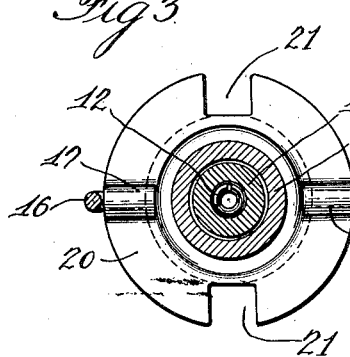
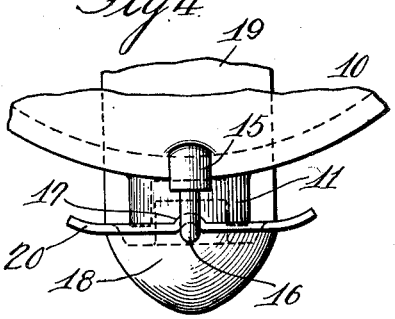

Patented May 11, 1926.

1,584,362

UNITED STATES PATENT OFFICE.

JEREMIAH C. FITZGERALD, OF KILBOURN, WISCONSIN.

DRINKING BOWL FOR ANIMALS.

Application filed November 11, 1925. Serial No. 68,285.

This invention relates to improvements in drinking fountains or bowls for animals or live stock, and is particularly designed for used in dairy work, within the stalls for the animals, but may be employed in any desired places for watering stock or animals, and it consists in certain peculiarities of the construction, novel arrangement and combination of the various parts thereof, as will be hereinafter more fully set forth and specifically claimed.

The objects of this invention are—

To provide a bowl free from any valve mechanism whatever within the bowl, so as to allow it to be used for the free use of water and so that the valve used for supplying water to said bowl may be located at a point outside of the bowl for ease in cleaning the same and so that it will not become clogged by straw or sediment of any kind.

To provide a water supplying valve of such construction and arrangement of its parts that it may be easily cleaned and shall be equipped with means for adjusting the valve head thereof.

A further object of the invention is, to provide means for rotatably mounting the valve casing of said water supplying-valve, so that it may be turned to any suitable angle for connection with a water-supply-pipe, whether said pipe may be located substantially vertically or horizontally.

Still another object is, the provision of means in a drinking-bowl of the class herein described, having strong and durable means for detachably connecting the bowl to a stall bracket or part to support the same independently of the water-supply-valve or its supply pipe.

Furthermore, to provide a bowl which may be easily detached and removed from its support for cleaning purposes without disturbing the water supply valve or any parts thereof, or the means for operating said valve.

A still further object is to furnish means for straining or filtering the water as it is supplied to the drinking bowl.

Other objects and advantages of the invention will be disclosed in the following description and explanation, which, will be more readily understood when read in conjunction with the accompanying drawings in which an embodiment of the invention is illustrated, it being understood that modifications and changes may be resorted to without a departure from the spirit of the invention so long as they fall within the scope of the appended claims.

In the drawings, Fig. 1 is a vertical central sectional view through the bowl, its support and the valve for supplying water to said bowl.

Fig. 2 is a plan sectional view of the device.

Fig. 3 is a plan sectional view taken on line 3—3 of Fig. 1 looking in the direction indicated by the arrows.

Fig. 4 is a fragmental view in elevation of the lower part of the bowl and the means on which it is detachably mounted taken on line 4—4 of Fig. 1 looking in the direction indicated by the arrows.

Fig. 5 is a view partly in section and partly in elevation taken on line 5—5 of Fig. 1 showing the rotatable valve-casing and its controlling valve.

Fig. 6 is a detached perspective view of a member used for deflecting water from the valve, and Fig. 7 is a detached plan view taken on line 7—7 of Fig. 1 as indicated by the arrows showing a portion of the detachable filter for the water as it is supplied to the bowl.

Like numerals of reference refer to similar parts throughout the different views of the drawings.

The drinking bowl of the device is designated as a whole by the reference numeral 10 and may be made of any suitable size and material. This bowl is provided at the central portion of the lower part of its bottom with a depending socket 11 which is by preference circular in shape to receive one end of a coil spring 12 which spring is seated at its other end in the socket or opening 13 of an upwardly extended and preferably cylindrically shaped part 14 which also fits for vertical movement in the lower portion of the socket 11 on the bowl. Located diametrically opposite each other with respect to the socket 11 and on the lower surface of the bowl is a pair of apertured lugs 15 into each of which is extended and may be fastened in any suitable way, the upper ends of hooks 16, the lower or horizontal portions of which engage diametrically disposed and inwardly extended recesses 17 formed in the head 18 of the supporting bracket 19 for the bowl.

As is clearly shown in Fig. 1 the head 18 and the bracket 14, thereon, are made integrally with the supporting bracket 19 for the bowl. It will also be seen by reference to said figure, as well as to Figs. 2 to 4 inclusive that the head 18 has a surrounding flange 20 in the lower portion of which the recesses 17 are formed so as to extend upwardly. This flange also has provided in each of its sides a slot 21 to enable the hooks 16 to be released from their recesses 17 when it is desired to turn the bowl laterally, when it is obvious that the horizontal portion of the hooks 16 will be positioned in the slots 21 so that the bowl can be raised upwardly and removed from the bracket 19 which latter supports the bowl.

It will be seen in Figs. 1 and 2 that the bracket 19 is downwardly curved and has at its upper end on one side thereof an arm 22 which extends laterally and is secured by means of a curved clamping member 23 to a post or part 24 of a stall which post is vertically mounted. The curved member 23 has each of its ends screw-threaded and said ends are extended through suitable openings in the arm 22 and held in place by means of nuts 25 in screw engagement with said ends. Thus it will be understood that the bracket 19 and bowl 10 can be supported at a convenient height for an animal to place its mouth within the bowl and that the bracket 19 can be readily removed by detaching the nuts 25. Furthermore, it will be understood that the bowl when in normal position on the bracket 19, can be slightly depressed against the spring 12, which operation will free the hooks 16 from their recesses 17, thus allowing the bowl to be turned on the part 14 so that the hooks 16 may register or enter the slots 21 of the flange of the bracket head, when it is obvious the bowl may be elevated and removed from said bracket.

In the present instance, I have shown the water supply pipe 26 as being vertically disposed with its lower end terminating some distance above the rim of the bowl and also some distance above the upper end of the bracket 19. Screwed or fitted to the lower end of the pipe 26 is a rotatable water supplying valve casing 27 which has its discharging port or nozzle 28 located above the rim of the bowl, but with its free end in such a manner as to discharge water in said bowl. This valve casing 27, has in its wall near its outer end a coupling or opening 29 for the water pipe 26 and in its outer end a screw-threaded opening 30 in which opening is seated a plug 31 having a central aperture 32 for the operation of an adjusting screw 33 located therein. Within the valve chamber 34 and within a recess 35 on the inner surface of the plug 31 is a cup-shaped member 36 which co-operates with the screw 33 and serves to hold one end of a spring 37 the other end of which rests against the valve head 38 which valve head operates freely in the chamber 34 and is used for the purpose of closing the discharge port or nozzle 28 of the valve casing. This valve casing is provided at its end adjacent the bowl with a reduced chamber or portion 39 in which is located an apertured guide member 40 of the form shown in Fig. 5.

Extended towards the bowl 10, and from the guide member 40, is a valve-stem 41, which projects through the nozzle 28, as shown. Mounted above the bracket 19, and spaced therefrom is a supporting bracket 42, for a lever 43, used for operating the valve-head 38, in the casing 27, therefor. The bracket 42, has in its lower portion an opening 44 through which opening, the nozzle 28, of the valve casing is loosely or rotatably extended and is held in place on said bracket 42, by means of the shoulder 45 on one side of the bracket, and a nut 46 screwed on the nozzle 28, on the other side of the said bracket.

Secured at its upper end to the upper end of the bracket 42 by means of a pivot pin 47 is the valve-operating lever 43 which depends from its pivot downwardly and then forwardly into the bowl. In other words, this lever is curved downwardly and outwardly in its lower portion. The lever 43 is channeled in cross-section on its lower surface as is clearly shown in Fig. 7 of the drawings in which figure as well as in Fig. 1, it will be understood that the side portions of this lever has below the nozzle 28 inwardly extended lugs 48 arranged in pairs, one pair above the other which are employed for holding a screening member or filter 49 in place, which member may be made of fine wire screening cloth or the like. The member 49 is located on the lever 43 below the discharging end of the nozzle 27 as shown in Fig. 1 of the drawings, for the purpose of removing any sediment or impurities from the water as it is discharged from the nozzle.

Just below the filter 49, the lever 43 is provided with a float-valve 50 of any suitable material, which is pivotally mounted at its upper end on a rod 51 secured transversely in the side portions of said lever. This float-valve 50 is used to act as a check to the lever 43, for it is apparent that when a sufficient quantity of water is discharged, into the bowl, the float-valve 50 will be caused to assume the dotted line position shown in Fig. 1, and thus prevent the lever 43 being downwardly depressed and the supply-valve thereby operated.

In the front of the valve stem 41 on a transverse rod 52 is pivotally mounted a water deflecting member 53 which has its upper outer portion spoon-shaped or dished to divert the water from the nozzle 28 which might be discharged upwardly, into the bowl. The lower portion of the deflector 53 is made somewhat heavier than the upper portion so as to normally hold the deflector 53 in the position shown in Fig. 1 when it will rest on the valve stem 41 which it assists in operating.

To prevent accidental upward movement of the lever 43, by an animal, a wire loop 54 loosely fastened to the pivot 47 at one of the ends of said pivot, and having oppositely disposed hooks 55 at the other end of the loop, to stride the lever 43, and the bracket 42, is employed. This loop is so fastened to the pivot 47 that it may be easily removed so as to allow the lever 43 to be manually raised when desired.

Having thus fully described my invention, what I claim as new and desire to secure by Letters Patent is—

1. A drinking bowl for animals including in combination with a bowl, of a horizontally disposed and rotatable water-supplying-valve-casing having an opening in its wall for communication with a water-supply pipe, of means to support said valve adjacent said bowl.

2. In a drinking bowl for animals, the combination with a bowl, of a water-supply-valve mounted above the bowl and having a valve stem extended above the latter, a lever pivotally supported above the bowl and extended therein adjacent said stem and the central lower portion of the bowl and a filter or screening member detachably mounted on the rear portion of said lever below the discharging end of said valve.

3. In a drinking bowl for animals, the combination with a bowl, of a water-supply-valve therefor located above and independently of the bowl having its discharging ends disposed above its rim, a valve lever pivotally supported at its upper end above said discharging end of said valve and extended downwardly and inwardly of the bowl and co-operating with the valve for the operation of the latter and a deflector pivotally mounted on said valve lever adjacent the discharging end of said valve.

4. In a drinking bowl for animals, the combination with a bowl, of a water-supply-valve therefor located above and independently of the bowl having its discharging end disposed above its rim, a valve lever pivotally supported at its upper end above said discharging end of said valve and extended downwardly and inwardly of the bowl and co-operating with the valve for the operation of the latter, a deflector pivotally mounted on said valve lever adjacent the discharging end of said valve, and a float pivotally attached to the rear portion of said lever for restricting the movement of the latter outwardly when a given quantity of water has been supplied to the bowl.

5. In a device of the class described, the combination with a bowl, of a water-supply-valve therefor located above the rim of said bowl, a valve lever loosely supported above the top of the bowl for removal purposes and extended downwardly and inwardly of the bowl and co-operating with the valve for the operation of the latter, said valve lever having means thereon to deflect the water into the bowl.

6. In a device of the class described, the combination with a bowl, of a water-supply-valve therefor located above its rim, of a valve lever pivotally supported at its end above said discharging end of said valve and extended downwardly and inwardly of the bowl and co-operating with the valve for the operation of the latter and a loop removably mounted at its upper end on the pivot of said lever and having oppositely disposed hooks at its lower end to engage said lever and its support.

7. In a device of the class described, the combination with a bowl-supporting bracket, of a bowl detachably mounted at its lower surface to said bracket, a valve casing mounted above and near the rim of the bowl, a supply pipe located adjacent thereto, a valve operating lever suitably supported above the discharging end of said valve casing and having its lower end located within the bowl, said valve lever provided with deflecting means above said casing to divert the water discharged therefrom into the bowl.

JEREMIAH C. FITZGERALD.